US012370816B2

(12) United States Patent
Aoki

(10) Patent No.: US 12,370,816 B2
(45) Date of Patent: Jul. 29, 2025

(54) SUPPORT UNIT AND PRINTING SYSTEM

(71) Applicant: SEIKO EPSON CORPORATION, Tokyo (JP)

(72) Inventor: Hiroki Aoki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 119 days.

(21) Appl. No.: 18/339,899

(22) Filed: Jun. 22, 2023

(65) Prior Publication Data

US 2023/0415500 A1 Dec. 28, 2023

(30) Foreign Application Priority Data

Jun. 23, 2022 (JP) ................................ 2022-100897

(51) Int. Cl.
*B41J 11/58* (2006.01)

(52) U.S. Cl.
CPC .................................... *B41J 11/58* (2013.01)

(58) Field of Classification Search
CPC ............... H04N 1/193; H04N 1/19594; H04N 1/00267; H04N 1/00013; H04N 2201/0434; H04N 2201/0436; H04N 1/1017; H04N 1/00681; H04N 2201/0081; G06F 3/0425; B41J 11/008; B41J 11/0095; G03B 21/2046
See application file for complete search history.

(56) References Cited

U.S. PATENT DOCUMENTS

| | | | | |
|---|---|---|---|---|
| 5,227,896 A * | 7/1993 | Ozawa | H04N 1/195 | 358/474 |
| 5,325,213 A * | 6/1994 | Takahashi | H04N 1/1026 | 271/193 |
| 5,610,720 A * | 3/1997 | Fujioka | H04N 1/1052 | 355/75 |
| 5,726,775 A * | 3/1998 | Walsh | H04N 1/0005 | 358/488 |
| 5,987,163 A * | 11/1999 | Matsuda | H04N 1/00681 | 358/488 |
| 6,067,112 A * | 5/2000 | Wellner | G06F 3/04883 | 348/136 |
| 6,678,076 B1 * | 1/2004 | Hasegawa | H04N 1/00745 | 358/408 |
| 7,477,426 B2 * | 1/2009 | Guan | G06T 5/90 | 358/1.9 |
| 8,970,886 B2 * | 3/2015 | Takabatake | H04N 1/00241 | 715/201 |
| 9,191,547 B2 * | 11/2015 | Inoue | H04N 1/00034 | |

(Continued)

FOREIGN PATENT DOCUMENTS

GB 0783149 A1 * 7/1997 ............. G06F 3/033

*Primary Examiner* — John Zimmermann
(74) *Attorney, Agent, or Firm* — WORKMAN NYDEGGER

(57) ABSTRACT

A support unit is configured to support a medium that is imaged by an imaging device and on which printing is performed by a printing apparatus in accordance with a result of the imaging. The support unit includes a table unit including a support region that supports the medium and a non-support region that does not support the medium, and a sandwiching unit having a portion with light transmissivity and being configured to sandwich the medium with the table unit. The non-support region is provided with a plurality of marks recognizable by the imaging device.

7 Claims, 12 Drawing Sheets

(56) References Cited

U.S. PATENT DOCUMENTS

| | | | | |
|---|---|---|---|---|
| 9,521,276 | B2 * | 12/2016 | Short | H04N 1/00267 |
| 9,781,291 | B2 * | 10/2017 | Oshima | H04N 1/19594 |
| 10,481,475 | B2 * | 11/2019 | Wu | H04N 23/56 |
| 2004/0085596 | A1 * | 5/2004 | Chen | H04N 1/2032<br>358/493 |
| 2007/0296695 | A1 * | 12/2007 | Shi | H04N 1/00334<br>345/157 |
| 2012/0256995 | A1 | 10/2012 | Holzer | |

* cited by examiner

SUPPORT UNIT AND PRINTING SYSTEM

The present application is based on, and claims priority from JP Application Serial Number 2022-100897, filed Jun. 23, 2022, the disclosure of which is hereby incorporated by reference herein in its entirety.

BACKGROUND

1. Technical Field

The present disclosure relates to a support unit and a printing system.

2. Related Art

Hitherto, as described in US 2012/0256995 A1, there has been discloses a printing apparatus including a camera capable of detecting a printing base material placed on a printing table. The printing apparatus further includes a control unit that controls a printing condition in accordance with a detection result from the camera.

In a case of the printing apparatus descried above, a user may additionally provide a camera for imaging (detecting) the printing base material. In other words, the printing apparatus does not include a camera, and the camera owned by the user images the printing base material instead. In this case, a printing condition for the printing base material is determined based on an imaging result from the camera provided by the user. However, even though a configuration of the printing apparatus is simplified, an imaging result varies due to variation of an imaging method performed by a user or the like. With this, information relating to the printing base material also varies, and a risk of inappropriate printing control may arise.

SUMMARY

A support unit is configured to support a medium that is imaged by an imaging device and on which printing is performed by a printing apparatus in accordance with a result of the imaging. The support unit includes a table unit including a support region that supports the medium and a non-support region that does not support the medium, and a sandwiching unit having a portion with light transmissivity and configured to sandwich the medium with the table unit. The non-support region is provided with a plurality of marks recognizable by the imaging device.

A printing system includes a support unit configured to support a medium imaged by an imaging device, a processing unit configured to process image data of an image captured by the imaging device, and a printing unit configured to perform printing on the medium in accordance with a result of the processing of the image data by the processing unit. The support unit includes a table unit including a support region that supports the medium and a non-support region that does not support the medium, and a sandwiching unit having a portion with light transmissivity and being configured to sandwich the medium with the table unit. The non-support region is provided with a plurality of marks recognizable by the imaging device. The image data includes medium image data being image data of the medium and mark image data being image data of the plurality of marks imaged together with the medium.

DESCRIPTION OF EXEMPLARY EMBODIMENTS

1. First Exemplary Embodiment

First, a configuration of a support unit 10 is described.

The support unit 10 is configured to support a medium S imaged by an imaging device CD (for example, a digital camera). The medium S is a medium on which printing is performed by a printing apparatus, and is fabrics, paper, or the like. The printing apparatus includes a transport unit that transports the medium S, a recording unit that ejects ink onto the medium S, and the like. Further, the imaging device CD is provided by each user in the present exemplary embodiment, and the support unit 10 includes a configuration without the imaging device CD.

Here, when a predetermined printing apparatus performs printing on the medium S, a property of the medium S is grasped based on image data of the medium S, and an appropriate printing condition is set in some cases. However, when an imaging method of the imaging device CD, an imaging environment, or the like varies, image data of the medium S varies. As a result, a property of the medium S cannot be grasped correctly, and a risk of setting an inappropriate printing condition may arise.

In view of this, the support unit 10 in the present exemplary embodiment is configured so that, even when an imaging method of the imaging device CD or the like varies depending on a user, the acquired image data can easily be corrected and a property of the medium S can be grasped.

Specific configurations are described below.

As illustrated in FIG. 1 to FIG. 4, the support unit 10 includes a table unit 20 and a sandwiching unit 30.

Figure 1:
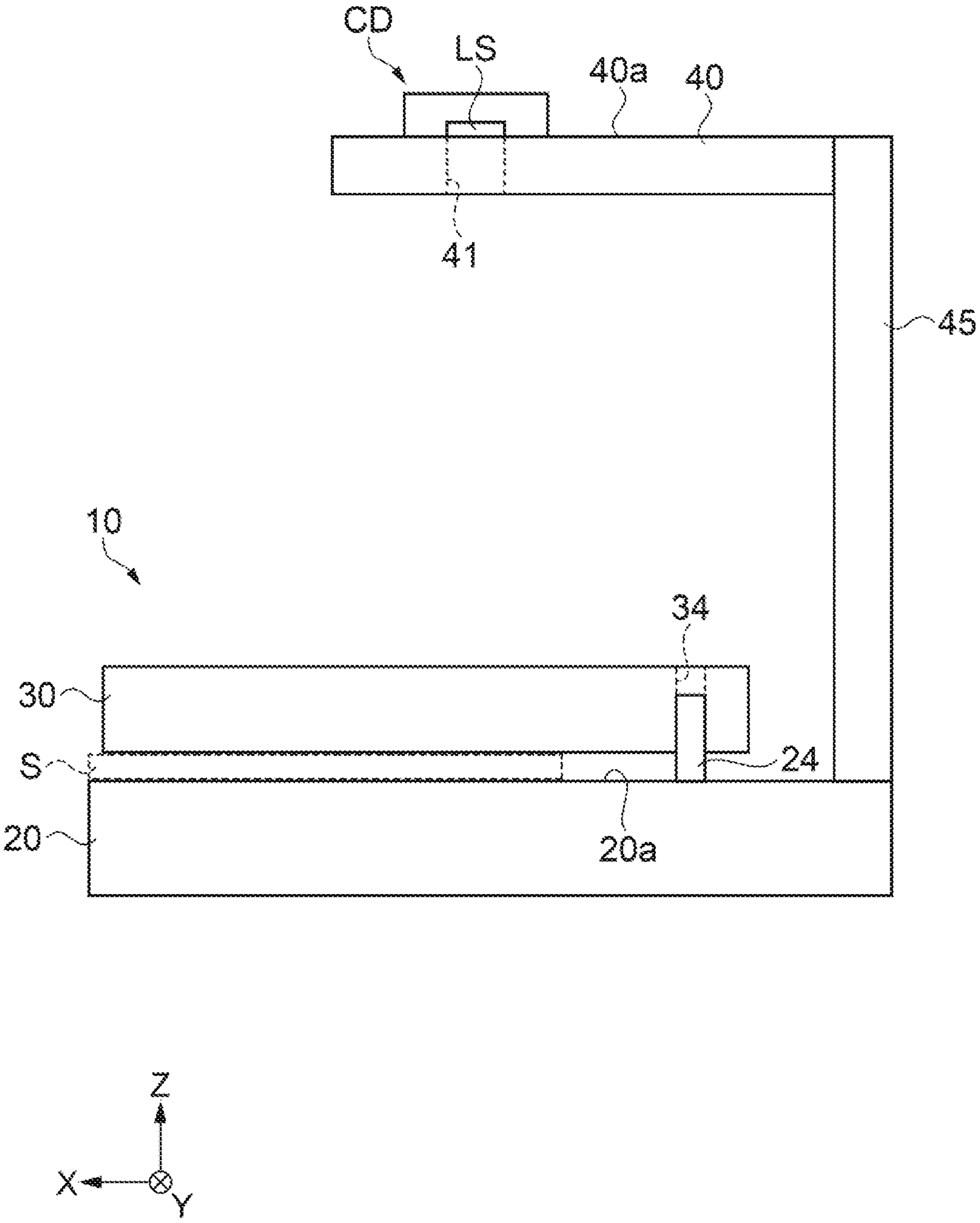
FIG. 1 is a schematic view illustrating a configuration of a support unit according to a first exemplary embodiment.
Figure 2:
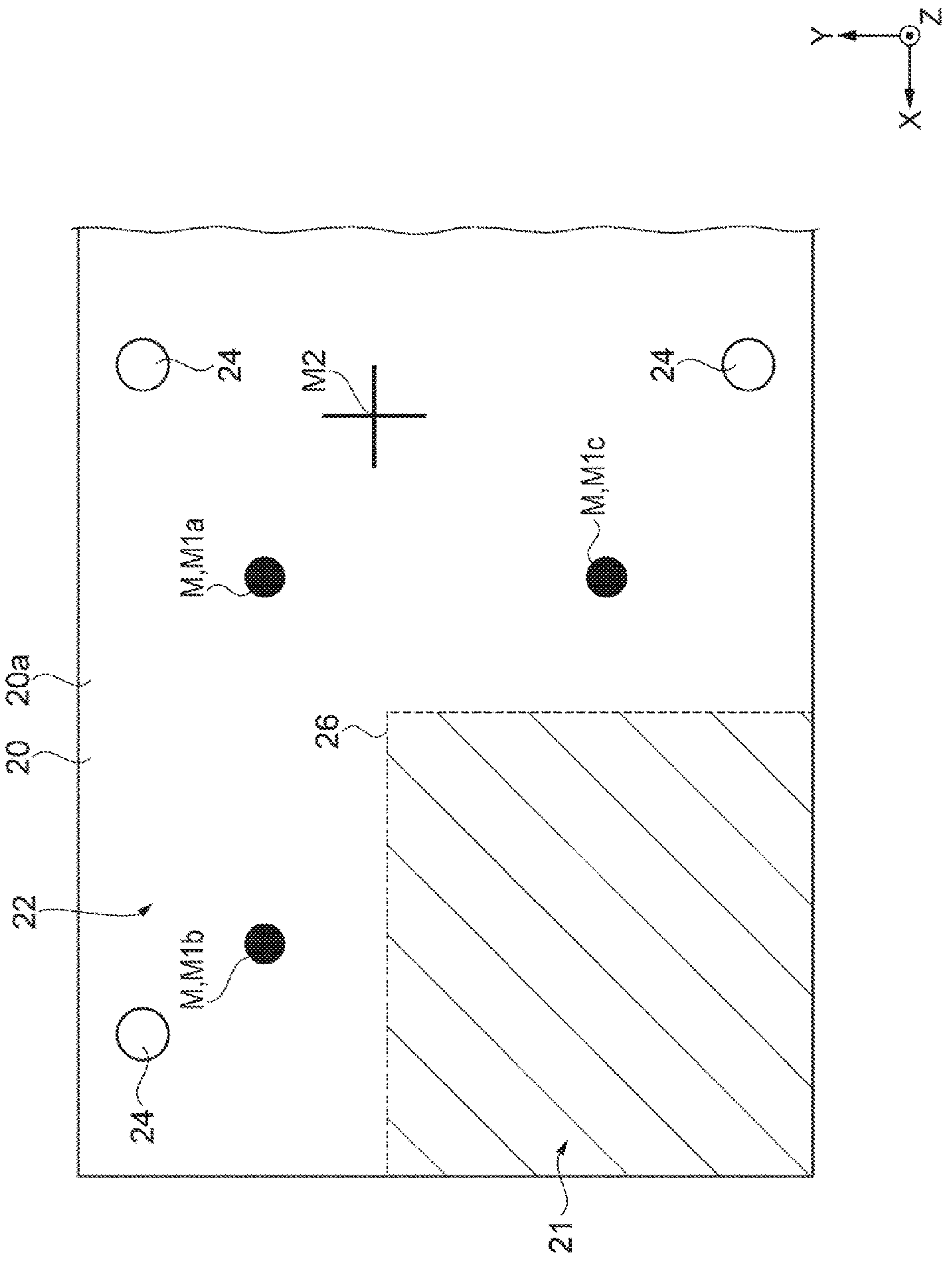
FIG. 2 is a schematic view illustrating a configuration of a table unit according to the first exemplary embodiment.

The table unit 20 has a rectangular parallelepiped shape. An upper surface of 20*a* being an end of the table unit 20 in a +Z direction in the present exemplary embodiment is a flat surface. The upper surface of 20*a* includes a support region 21 for supporting the medium S and a non-support region 22 not for supporting the medium S (FIG. 2). The support region 21 is a region that supports the medium S at the time of imaging the medium S with the imaging device CD. The support region 21 in the present exemplary embodiment is a region extending in a direction along an X-axis from a center to an end portion of the table unit 20 in a +X direction, and is a region extending in a direction along a Y-axis from the center to an end portion of the table unit 20 in a −Y direction.

The non-support region 22 is a region of the upper surface 20*a* other than the support region 21. The non-support region 22 is provided with a plurality of marks M that can be recognized by the imaging device CD. In the present exemplary embodiment, three marks M (M1*a*, M1*b*, M1*c*) are provided (FIG. 2). Those marks M may directly be printed on the upper surface 20*a*, or may be printed on a label adhering to the upper surface 20*a*.

Further, the entire upper surface 20*a* in the present exemplary embodiment is a black-based color. The medium S to be supported is a white-based color in most cases, and hence a state of a leading edge of the medium S can clearly be grasped with a high contrast. The color of the mark M is only required to be recognizable with respect to the color of the upper surface 20*a* and recognizable with the imaging device. The color of the mark M in the present exemplary embodiment is a red-based color. Further, the shape of the mark M is not particularly limited, and is circular, for example.

Note that the color of the upper surface 20*a* of the table unit 20 may be configured to be changeable. For example, the table unit 20 is configured as a liquid crystal panel, and changes the color of the surface of the table unit 20 in accordance with the color of the medium S. For example, when the medium S is a black-based color, the color of the upper surface 20*a* is changed to a white-based color. Further, similarly to this, the color of the mark M may be configured to be changeable.

The three marks M (M1*a*, M1*b*, M1*c*) in the present exemplary embodiment are not arranged on the same linear line. Specifically, the mark M1*a* is arranged in the −X direction from the center of the table unit 20 in the direction along the X-axis, and is arranged in the +Y direction from the center of the table unit 20 in the direction along the Y-axis. The mark M1*b* is arranged in the +X direction of the direction along the X-axis of the mark M1*a*. The mark M1*c* is arranged in the −Y direction of the direction along the Y-axis of the mark M1*a*. With this, for example, even when the medium S is imaged obliquely, or the medium S supported obliquely on the support region 21 is imaged, correction can be performed with the three marks M (M1*a*, M1*b*, M1*c*) as references.

Further, distances between the respective marks M (M1*a*, M1*b*, M1*c*) are defined. Specifically, the distance between the center of the mark M1*a* and the center of the mark M1*b* has a defined dimension. Further, the distance between the center of the mark M1*a* and the center of the mark M1*c* has a defined dimension. With this, even when the distance between the medium S (the table unit 20) and the imaging device CD varies at the time of imaging, variation of image data at the time of imaging can easily be corrected based on a scale factor of the distances between the marks M (M1*a*, M1*b*, M1*c*).

Further, when the medium S is placed on the upper surface 20*a*, care needs to be taken so as to prevent the medium S from covering the mark M. Thus, in the present exemplary embodiment, a linear boundary mark 26 is formed at the boundary between the support region 21 and the non-support region 22. The medium S is placed by following the boundary mark 26, and thus the medium S can be prevented from covering the mark M.

Note that the support region 21 may be a recessed portion that is recessed from the upper surface 20*a* from a −Z direction. In other words, the upper surface 20*a* of the support region 21 may be recessed from the upper surface 20*a* of the non-support region 22 the Z direction. In this manner, the support region 21 is also defined as the non-support region 22, and the medium S can be prevented from covering the mark M. Further, in this case, a level difference is generated between the upper surface 20*a* of the support region 21 and the upper surface 20*a* of the non-support region 22. A user can easily position the medium S with respect to the support region 21 by abutting the medium S against the level difference. Note that, in FIG. 2, the support region 21 is indicated with a dashed line.

Figure 3:
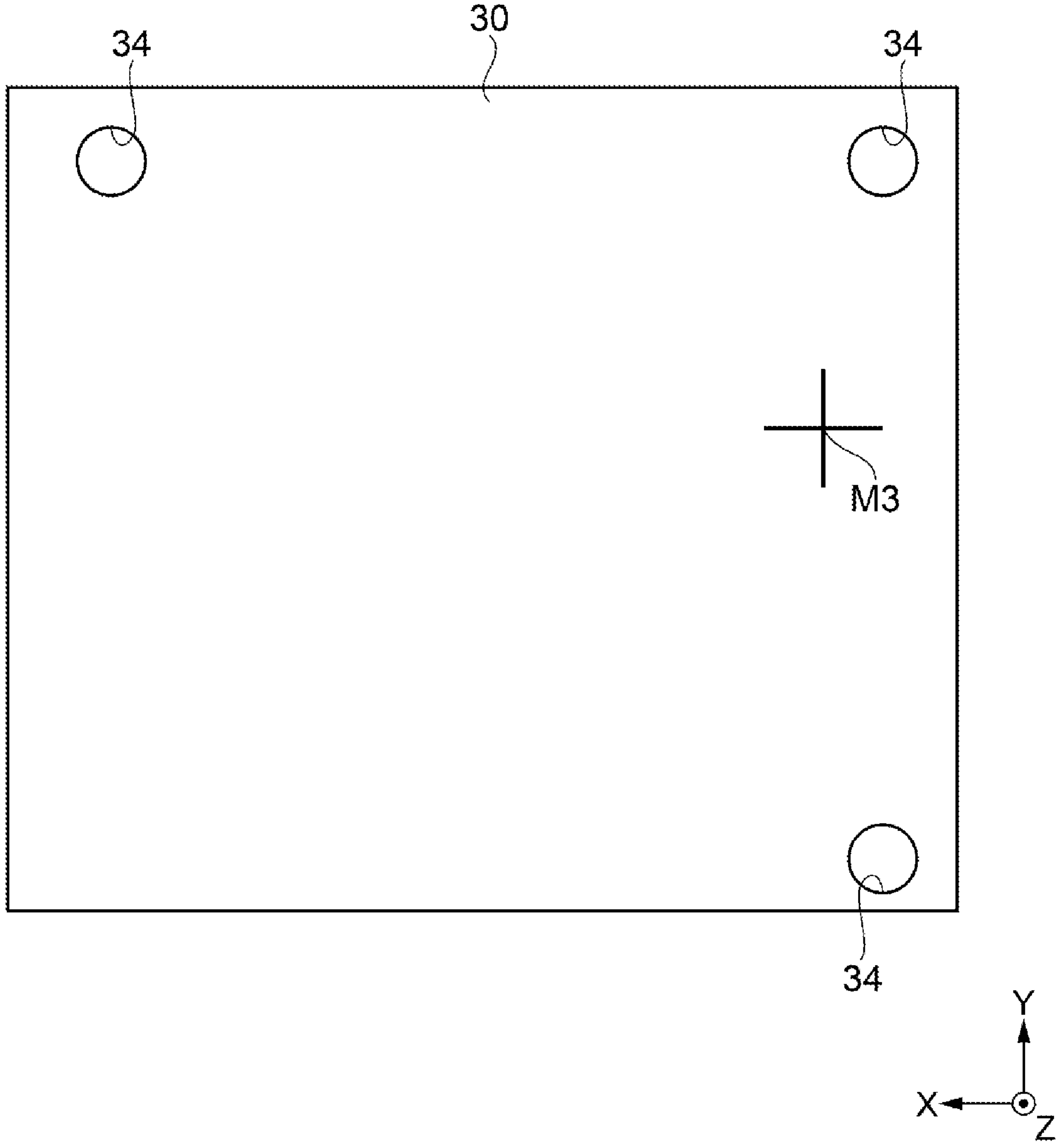
FIG. 3 is a schematic view illustrating a configuration of a sandwiching unit according to the first exemplary embodiment.

The sandwiching unit 30 faces the upper surface 20*a* of the table unit 20 to sandwich the medium S together with the table unit 20. The sandwiching unit 30 is a plate-like member (FIG. 3). The medium S is sandwiched between the table unit 20 and the sandwiching unit 30, and thus the medium S can stably be held on the table unit 20.

Figure 4:
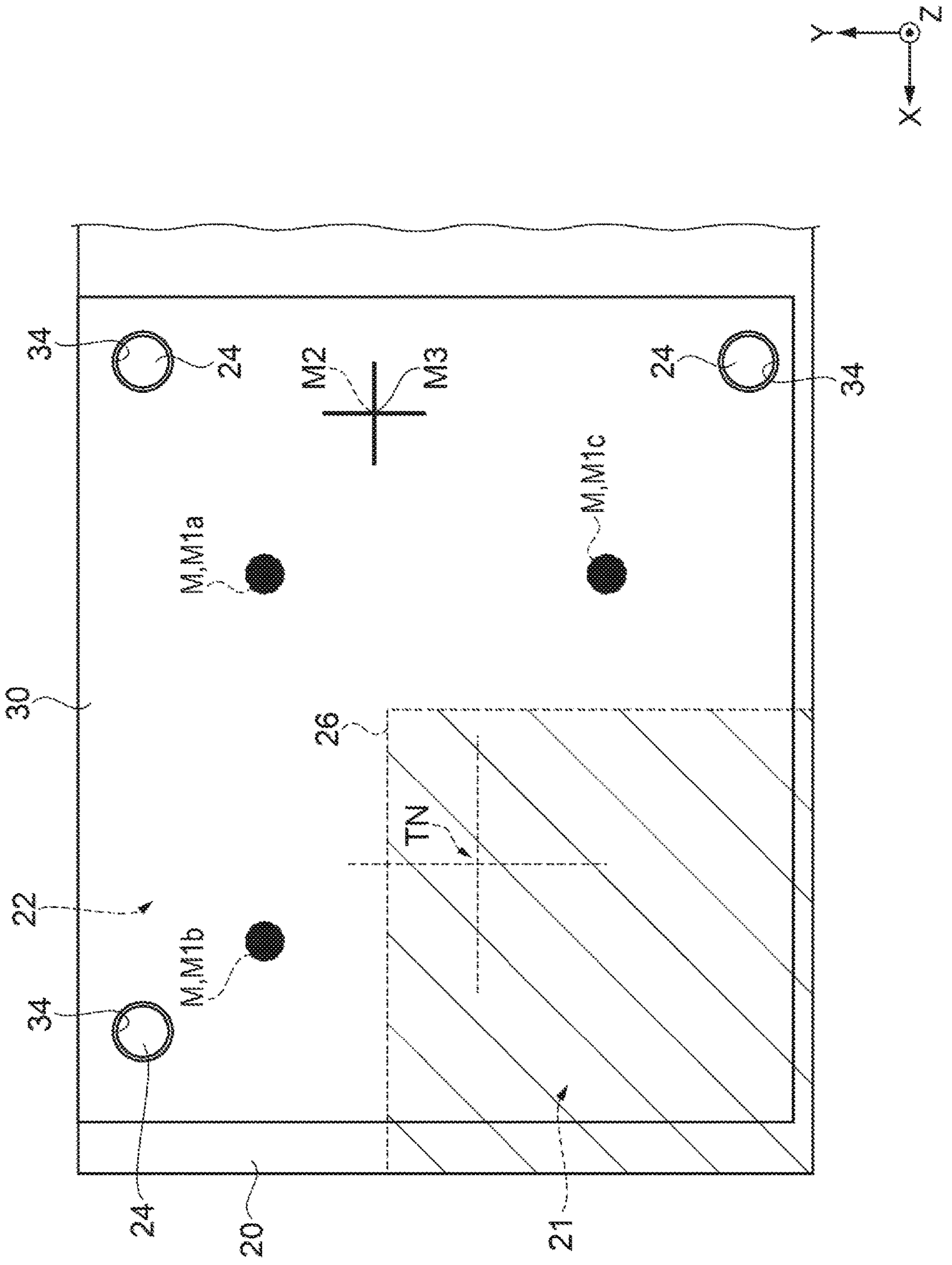
FIG. 4 is a schematic view illustrating a configuration of the support unit according to the first exemplary embodiment.
Figure 5:
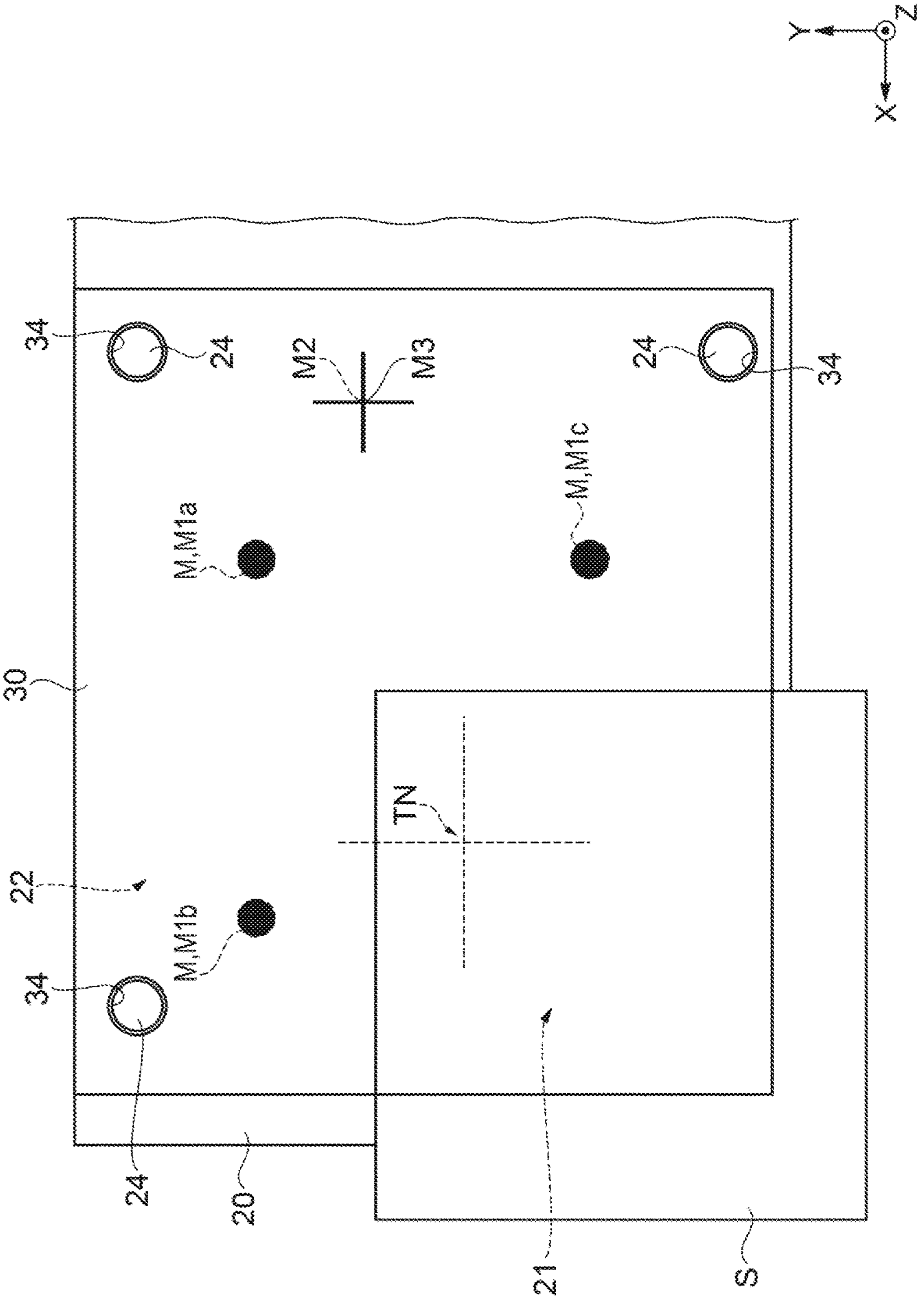
FIG. 5 is a schematic view illustrating a configuration of a usage method of the support unit according to the first exemplary embodiment.

The sandwiching unit 30 has a portion with light transmissivity. The sandwiching unit 30 is formed of, for example, a glass material. In the sandwiching unit 30, when the medium S is sandwiched between the table unit 20 and the sandwiching unit 30, at least a part of the sandwiching unit 30 that corresponds to the support region 21 and a part thereof corresponds to the marks M (M1*a*, M1*b*, M1*c*) have light transmissivity (FIG. 4, FIG. 5). With this, the imaging device CD is capable of easily imaging the medium S and the mark M through the sandwiching unit 30. Note that the sandwiching unit 30 may be a frame-like shape having an opening. Specifically, when the medium S is sandwiched between the table unit 20 and the sandwiching unit 30, the sandwiching unit 30 may be a frame member having an opening that is at least provided in a portion corresponding to the support region 21 of the sandwiching unit 30 and a portion corresponding to the mark M. In other words, the configuration is not particularly limited as long as the sandwiching unit 30 allows light to pass therethrough and the medium S is sandwiched between the table unit 20 and the sandwiching unit 30.

Further, the table unit 20 and the sandwiching unit 30 have positioning structures for mutual overlapping. Specifically, the positioning pin 24 protruding from the upper surface 20*a* in the +Z direction is arranged at an outer peripheral portion of the table unit 20. In the present exemplary embodiment, three positioning pins 24 are arranged.

Further, a through hole 34 through which each of the positioning pins 24 can be inserted is provided in an outer peripheral portion of the sandwiching unit 30. Each of the through holes 34 is a through hole passing through in a thickness direction of the sandwiching unit 30 (a direction along a Z-axis). When the medium S is sandwiched between the table unit 20 and the sandwiching unit 30, the through hole 34 of the sandwiching unit 30 is arranged in accordance with the positioning pin 24 of the table unit 20. With this, the table unit 20 and the sandwiching unit 30 can easily be positioned.

Further, the non-support region 22 of the table unit 20 is provided with a second mark M2 that can be recognized by the imaging device CD. The second mark M2 in the present exemplary embodiment has a cross-like shape. The color of the second mark M2 is, for example, a red-based color. The second mark M2 is arranged in the −X direction of the mark M1*a* and the mark M1*c* and at a center of the non-support region 22 in the direction along the Y-axis (FIG. 2).

Further, the sandwiching unit 30 is provided with a third mark M3 corresponding to the second mark M2. The third mark M3 in the present exemplary embodiment has a cross-like shape, and can be recognized with the imaging device CD. The color of the third mark M3 is, for example, a red-based color (FIG. 3). The third mark M3 is formed on an end surface of the sandwiching unit 30 in the −Z direction. Further, when the table unit 20 and the sandwiching unit 30 overlap with each other, the third mark M3 is arranged above the second mark M2 (FIG. 4). Note that the second mark M2 and the third mark M3 may directly be printed on the upper surface 20*a* and the sandwiching unit 30, or may be printed on labels adhering thereto.

The second mark M2 and the third mark M3 are marks for acquiring thickness information relating to the medium S. Specifically, as illustrated in FIG. 5, for example, when imaging is performed while adjusting a focal point TN of the imaging device CD on the support region 21 that is present in the +X direction with respect to the second mark M2 and the third mark M3, the captured image is an image in which the portion including the second mark M2 and the third mark M3 is viewed obliquely. In other words, an image in which the second mark M2 and the third mark M3 are deviated from each other is obtained. Therefore, in accordance with the thickness of the medium S, a deviation amount between the second mark M2 and the third mark M3 varies. Thus, based on the deviation amount, a user (alternatively, a processing device or the like) can grasp information relating to the thickness of the medium S.

Note that the third mark M3 may be provided on an end surface of the sandwiching unit 30 in the +Z direction. Further, the third mark M3 may be provided at a position deviated from the second mark M2 by a predetermined distance as viewed downward. In this manner, the thickness dimension of the sandwiching unit 30 and the original deviation amount between the second mark M2 and the third mark M3 are offset by the predetermined distance during correction of image data. Thus, the information relating to the thickness of the medium S can also be acquired.

Further, the support unit 10 includes a placement unit 40 on which the imaging device CD is placed in a state in which a lens unit LS of the imaging device is directed to the medium S supported on the table unit 20. The lens unit LS forms an image by collecting light reflected from the medium S. The placement unit 40 is arranged above the table unit 20. Specifically, the support unit 10 includes a columnar unit 45 that extends in the +Z direction from an end portion of the table unit 20 in the −X direction, and the placement unit 40 is arranged so as to protrude from the columnar unit 45 in the +X direction.

The placement unit 40 is a plate-like member. The imaging device CD is placed on a placement surface 40*a* being an end surface of the placement unit 40 in the +Z direction. The placement surface 40*a* has an area that is large enough to place the imaging device CD thereon. Further, the placement unit 40 is provided with a through hole 41 passing therethrough along the Z direction. The imaging device CD is placed on the placement surface 40*a* so that the lens unit LS faces the table unit 20 through the through hole 41. The −Z direction of the through hole 41 corresponds to a focal point TN region of the imaging device CD. With this, a user can capture an image of the medium S while suppressing shaking regardless of performance of the imaging device CD.

Next, a usage method of the support unit 10 is described. First, the medium S is placed on the support region 21 of the table unit 20. At this state, the leading edge of the medium S is placed so as to follow the boundary mark 26. The medium S is a medium before printing performed by the predetermined printing apparatus. For example, as the medium S, a sample formed into a small piece-like shape may be used.

Further, the medium S is placed so as to define a transport direction in which the medium S is transported in the printing apparatus. For example, the medium S is placed on the table unit 20 while regarding the direction along the Y-axis as the transport direction. With this, information relating to weaving or a weaving pitch of the medium S in the transport direction can be acquired.

Subsequently, the sandwiching unit 30 is set, and then the medium S is sandwiched between the table unit 20 and the sandwiching unit 30. At this state, the through hole 34 of the sandwiching unit 30 is set in accordance with the positioning pin 24 of the table unit 20. With this, for example, a part of the medium S that is curved in a wave-like form can be corrected into a flat shape.

Subsequently, the imaging device CD is placed on the placement unit 40. Specifically, placement is performed so that the through hole 41 of the placement unit 40 matches with the lens unit LS of the imaging device CD.

Subsequently, the imaging device CD performs imaging while adjusting the focal point TN on the surface of the medium S. At this state, a region including the medium S, the marks M (M1*a*, M1*b*, M1*c*), the second mark M2, and the third mark M3 is imaged.

After that, a user can grasp a property of the medium S, based on the image data obtained through imaging by the imaging device CD.

Specifically, a processing device or the like is used to perform scale calculation for the image data, based on the distances between the marks M (M1*a*, M1*b*, M1*c*). With this, the image data can easily be corrected. Further, a surface state of the medium S, a weaving pitch dimension of the medium S, and a fuzz state of the medium S can be grasped.

Further, the deviation amount between the second mark M2 and the third mark M3 is read from the image data, and thus the information relating to the thickness of the medium S can be acquired.

As described above, according to the present exemplary embodiment, even when an imaging method of the imaging device CD or the like varies depending on a user, scale correction can be performed based on the dimensions between the marks M (M1*a*, M1*b*, M1*c*). Further, the thickness of the medium S can be measured from one piece of the image data, as well as a surface state of the medium. Thus, work efficiency is improved.

Therefore, the support unit 10 is used, and thus a property of the medium S can be grasped accurately. Further, an appropriate printing condition can be set based on a property of the medium S with respect to the predetermined printing apparatus that performs printing on the medium S.

2. Second Exemplary Embodiment

Next, a configuration of a support unit 10A according to a second exemplary embodiment is described. Note that configurations identical to those in the first exemplary embodiment are denoted with the same reference symbols, and redundant description thereof is omitted.

Figure 6:
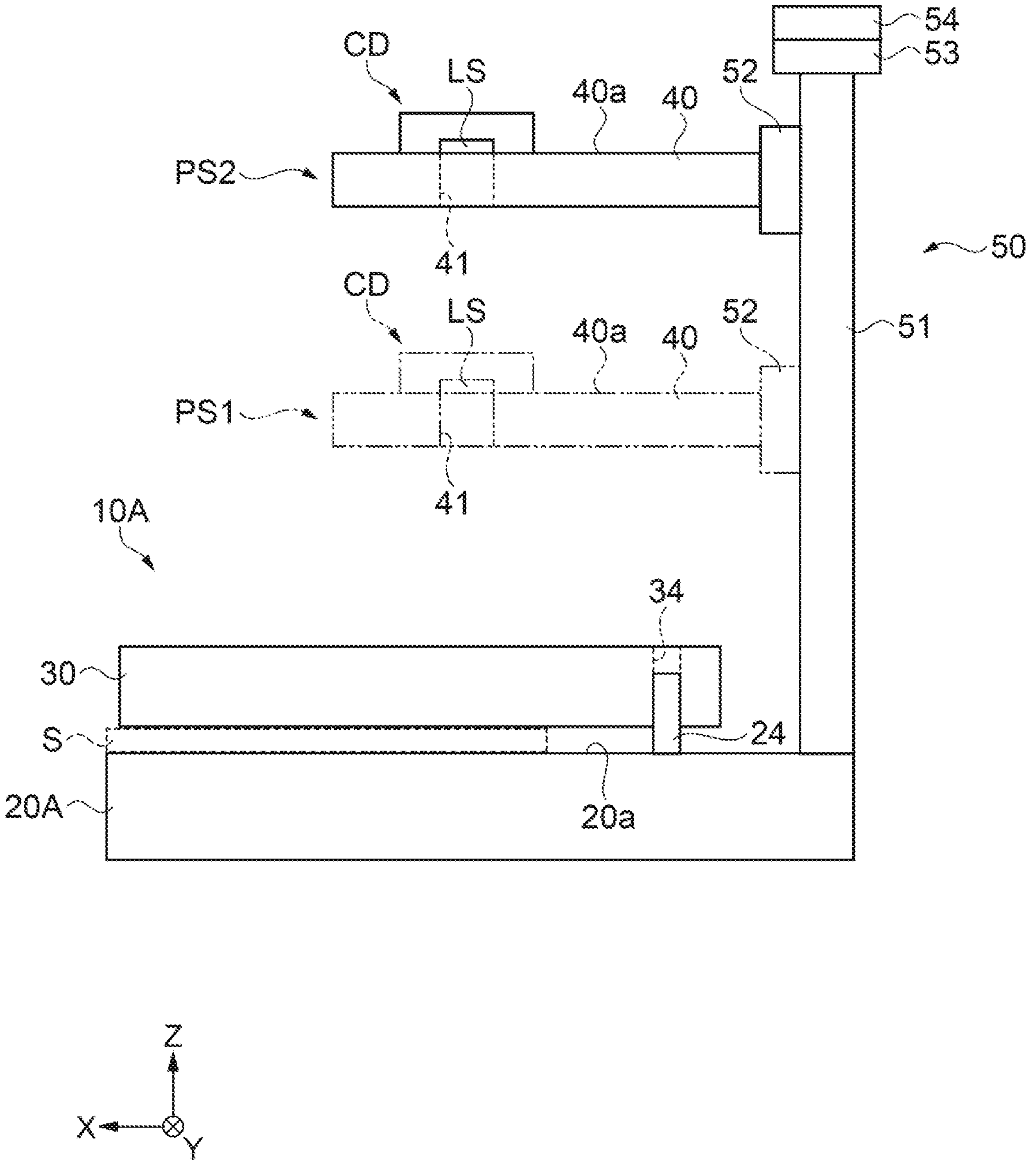
FIG. 6 is a schematic view illustrating a configuration of a support unit according to a second exemplary embodiment.

As illustrated in FIG. 6, the support unit 10A includes a table unit 20A, the sandwiching unit 30, and the placement unit 40. The placement unit 40 in the present exemplary embodiment is configured to be movable in a vertical manner along the Z-axis. In other words, the support unit 10A is configured so that a distance between the table unit 20A and the placement unit 40 is changeable.

The support unit 10A includes a lifting/lowering unit 50 capable of lifting and lowering the placement unit 40 with respect to the table unit 20A. The lifting/lowering unit 50 includes a ball screw shaft 51 extending from the table unit 20A in the +Z direction, a ball nut 52 engaged with the ball screw shaft 51, and a guide portion (not illustrated) for guiding the ball nut 52 in a moving direction. The ball screw shaft 51 is coupled to a motor 53. As the motor 53, any kind of motors such as a stepping motor, a servo motor, and a linear motor may be adopted. The ball nut 52 is driven by the motor 53 to be movable in a vertical manner along the Z-axis.

The placement unit 40 is fixed to the ball nut 52. With this, the placement unit 40 can be lifted and lowered.

Further, the lifting/lowering unit 50 includes a rotary encoder 54 that detects a rotation direction and a rotation amount of the motor 53 or the ball screw shaft 51. With this, the position (moving amount) of the placement unit 40 can be detected. The present exemplary embodiment is configured so that the distance between the upper surface 20*a* of the table unit 20A and the placement surface 40*a* of the placement unit 40 can be detected.

Note that the lifting/lowering mechanism of the placement unit 40 is not limited to the above-mentioned configuration, and may be a configuration including a cam mechanism or a solenoid.

Figure 7:
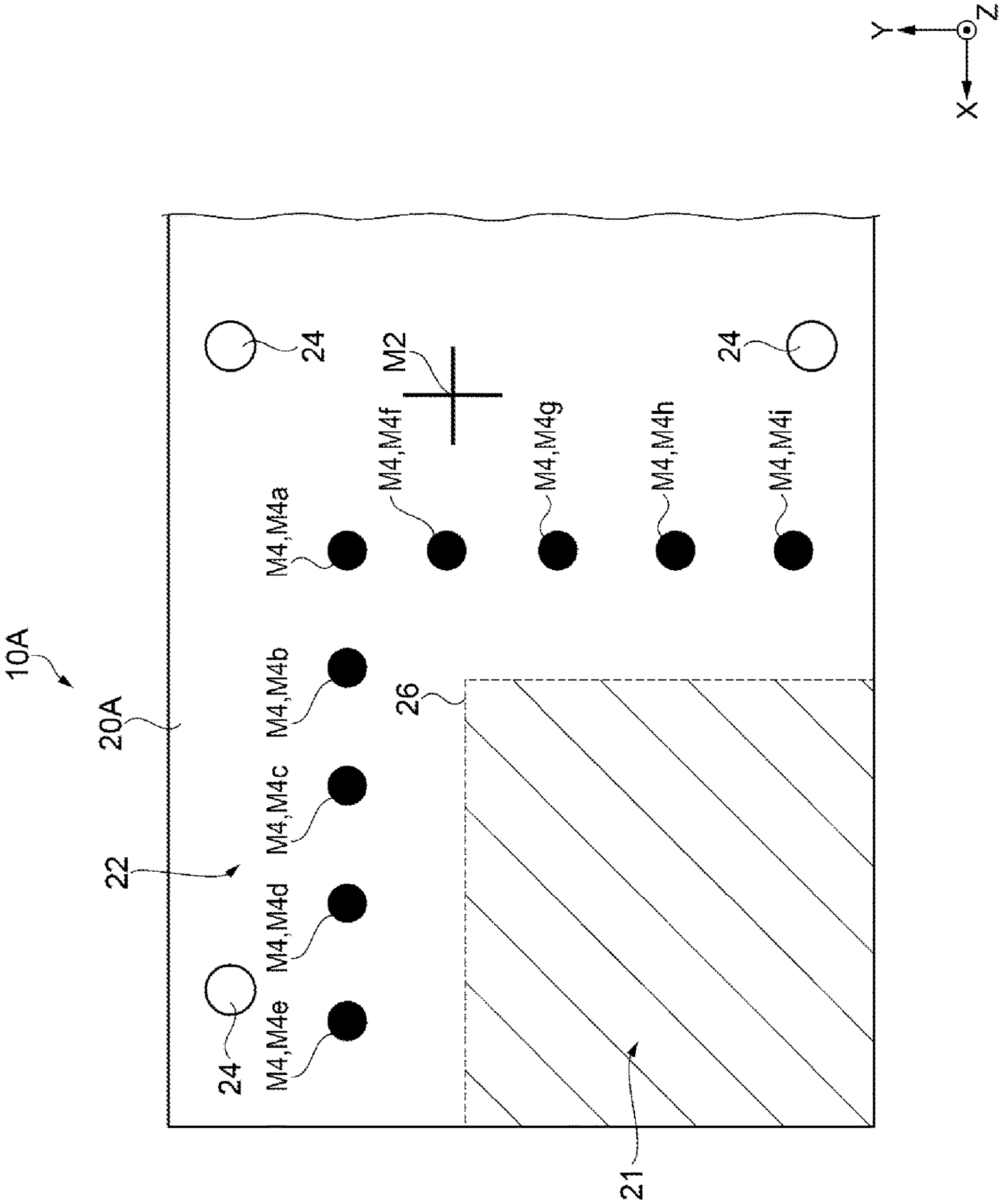
FIG. 7 is a schematic view illustrating a configuration of a table unit according to the second exemplary embodiment.

As illustrated in FIG. 7, the support unit 10A includes a plurality of light sources M4 (M4*a* to M4*i*) that can emit light and a control unit 60 (FIG. 8) that controls a lighting operation of the plurality of light sources.

The light sources M4 are arranged in the non-support region 22. The light sources M4 correspond to the marks M (M1*a*, M1*b*, M1*c*) in the first exemplary embodiment. In other words, in the present exemplary embodiment, light emitted from a plurality of lighted light sources M4 of the plurality of light sources M4. In this sense, the plurality of light sources M4 are configured similarly to the plurality of marks M. Note that the number of light sources M4 in the present exemplary embodiment is greater than the number of marks M in the first exemplary embodiment.

The light source M4 emits visible light. The light source M4 is, for example, a red-colored LED. A plurality of recesses along the −Z direction are formed in the upper surface 20*a* of the table unit 20A, and each of the light sources M4 is fitted in each of the recesses. For example, light is transmitted to each of the light sources M4 via a light-guiding member (an optical fiber and the like).

The plurality of light sources M4 in the present exemplary embodiment includes the light source M4*a*, the four light sources M4 (M4*b* to M4*e*) arranged to be arrayed in the direction along the X-axis from the light source M4*a* as a starting point, and the four light sources M4 (M4*f* to M4*i*) arranged to be arrayed in the direction along the Y-axis from the light source M4*a* as a starting point.

Specifically, the mark M4*a* is arranged in the −X direction from a center of the table unit 20A in the direction along the X-axis, and is arranged in the +Y direction from the center of the table unit 20A in the direction along the Y-axis. The light source M4*b* is arranged in the +X direction along the X-axis of the light source M4*a*. The light source M4*c* is arranged in the +X direction along the X-axis of the light source M4*b*. The light source M4*d* is arranged in the +X direction along the X-axis of the light source M4*c*. The light source M4*e* is arranged in the +X direction along the X-axis of the light source M4*d*.

The distance between the light source M4*a* and the light source M4*b* is smaller than the distance between the light source M4*a* and the light source M4*c*. The distance between the light source M4*a* and the light source M4*c* is smaller than the distance between the light source M4*a* and the light source M4*d*. The distance between the light source M4*a* and the light source M4*d* is smaller than the distance between the light source M4*a* and the light source M4*e*. In other words, the distance from the light source M4*a* as a starting point is increased in the order of the light source M4*b*, the light source M4*c*, the light source M4*d*, and the light source M4*e*.

The distance between the light source M4*a* and the light source M4*b*, the distance between the light source M4*a* and the light source M4*c*, the distance between the light source M4*a* and the light source M4*d*, and the distance between the light source M4*a* and the light source M4*e* have defined dimensions.

The light source M4*f* is arranged in the −Y direction along the Y-axis of the light source M4*a*. The light source M4*g* is arranged in the −Y direction along the Y-axis of the light source M4*f*. The light source M4*h* is arranged in the −Y direction along the Y-axis of the light source M4*g*. The light source M4*i* is arranged in the −Y direction along the Y-axis of the light source M4*h*.

The distance between the light source M4*a* and the light source M4*f* is smaller than the distance between the light source M4*a* and the light source M4*g*. The distance between the light source M4*a* and the light source M4*g* is smaller than the distance between the light source M4*a* and the light source M4*h*. The distance between the light source M4*a* and the light source M4*h* is smaller than the distance between the light source M4*a* and the light source M4*i*. In other words, the distance from the light source M4*a* as a starting point is increased in the order of the light source M4*f*, the light source M4*g*, the light source M4*h*, and the light source M4*i*.

The distance between the light source M4*a* and the light source M4*f*, the distance between the light source M4*a* and the light source M4*g*, the distance between the light source M4*a* and the light source M4*h*, and the distance between the light source M4*a* and the light source M4*i* have defined dimensions.

Note that the configuration of the sandwiching unit 30, and the configurations of the second mark M2 and the third mark M3 are similar to those in the first exemplary embodiment, and hence description thereof is omitted.

Figure 8:
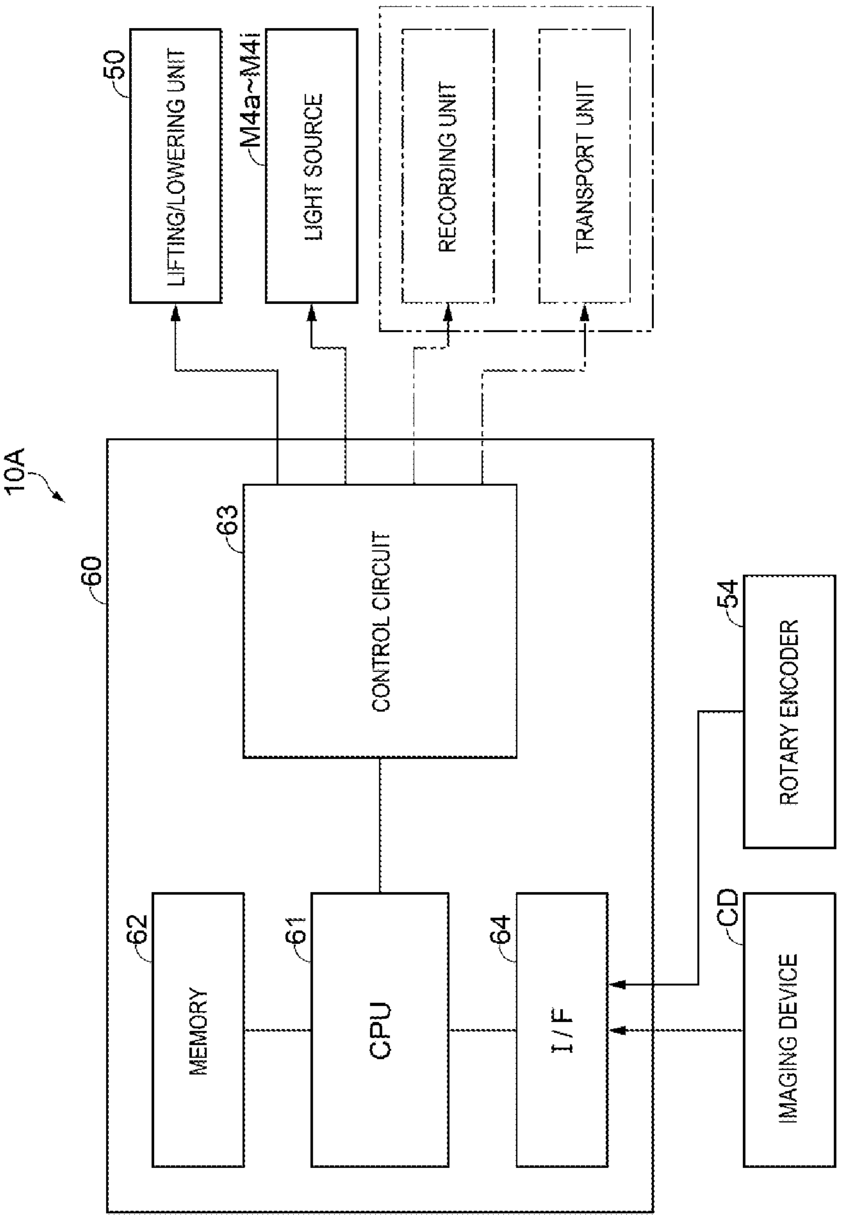
FIG. 8 is a block diagram illustrating a control configuration of the support unit according to the second exemplary embodiment.

As illustrated in FIG. 8, the control unit 60 includes a CPU 61, a memory 62, a control circuit 63, and an interface (I/F) 64. The CPU 61 is an arithmetic processing device. The memory 62 is a storage device ensuring a region for storing various programs, a working region, and the like, and includes a storage element such as a RAM and an EEPROM. Further, the control unit 60 acquires the image data of the region including the medium S and the light source M4, from the imaging device CD via the I/F 64. Further, the control unit 60 acquires position data (height data) relating to the placement unit 40, from the rotary encoder 54 via the I/F 64.

Further, the memory 62 includes table data in which position data of the placement unit 40 and a predetermined light source M4 to be turned on or off based on the position data of the placement unit 40 are associated with each other.

In the control unit 60 in the present exemplary embodiment, when the position data of the placement unit 40 is acquired from the rotary encoder 54 via the I/F 64, the CPU 61 performs an arithmetic operation while following the program and the table data. Then, a lighting operation of each of the light sources M4 is controlled via the control circuit 63.

Note that, in the present exemplary embodiment, the light source M4*a* of the plurality of light sources M4 is regarded as a reference, and the light source M4 other than the light source M4*a* is switched between light-on and light-off in a state in which the light source M4*a* is continuously lighted.

Figure 9:
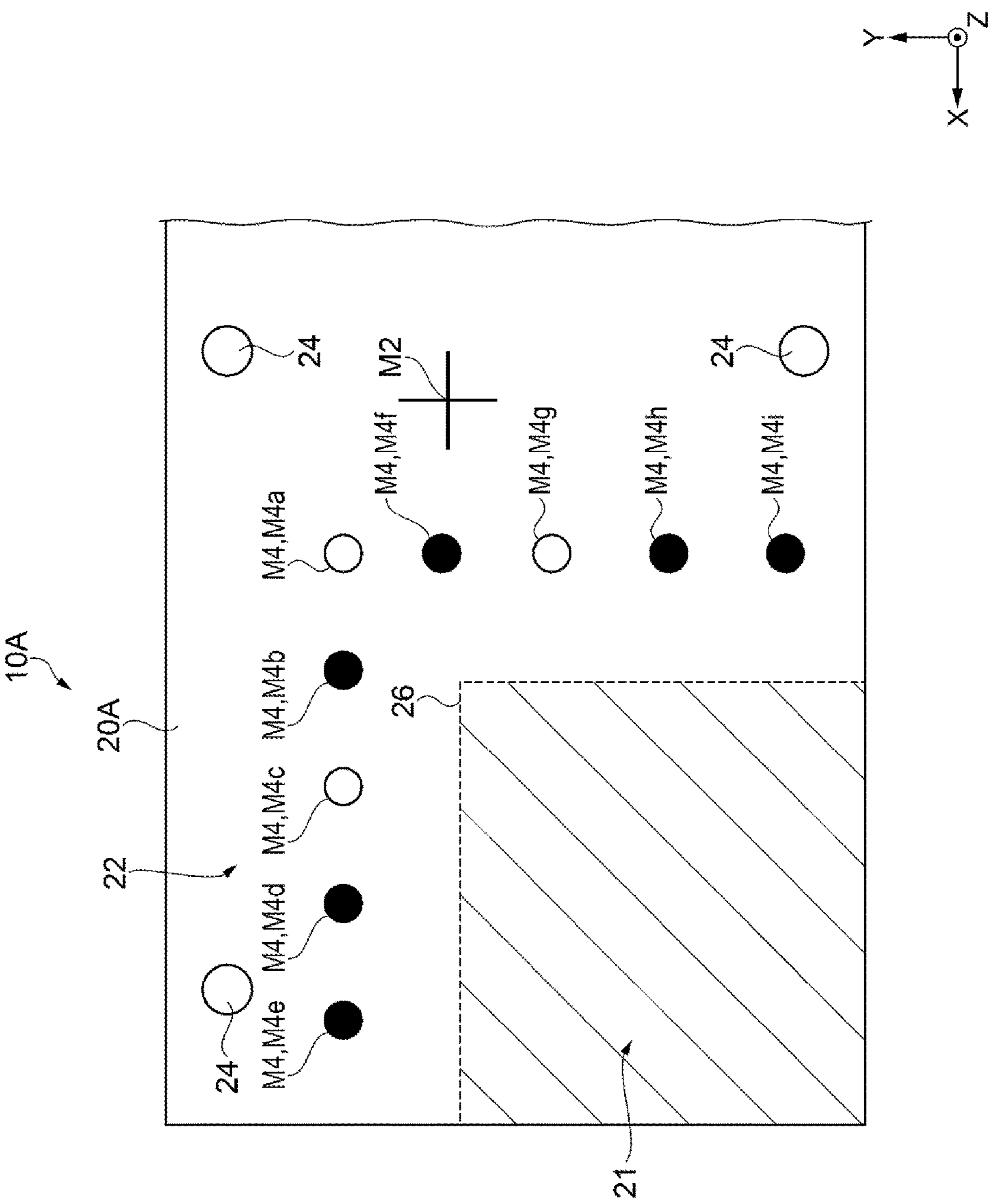
FIG. 9 is a schematic view illustrating a configuration of a control method of the support unit according to the second exemplary embodiment.

For example, as illustrated in FIG. 6 and FIG. 9, when the placement unit 40 is at a first position PS1, the control unit 60 lights the light source M4*a*, the light source M4*c*, and the light source M4*g* (indicated with the white circle (open circle, ○) in the drawing), based on the position data from the rotary encoder 54. Further, the light sources M4 other than those are turned off (indicated with the black circle (filled circle, ●) in the drawing).

Further, in this state, the imaging device CD performs imaging while adjusting the focal point TN on the surface of the medium S. The control unit 60 acquires the image data from the imaging device CD via the I/F 64. The image data includes medium image data being the image data of the medium S and mark image data being the image data of the light sources M4 (M4*a*, M4*c*, M4*g*), the second mark M2, and the third mark M3 that are imaged together with the medium S.

The control unit 60 performs scale calculation for the image data, based on the distances between the light source M4 (M4*a*, M4*c*, M4*g*). With this, the image data can easily be corrected. Further, a surface state of the medium S, a weaving pitch dimension of the medium S, a fuzz state of the medium S, and the like can be grasped. Further, the deviation amount between the second mark M2 and the third mark M3 in the image data is read, and thus the information relating to the thickness of the medium S is acquired.

Figure 10:
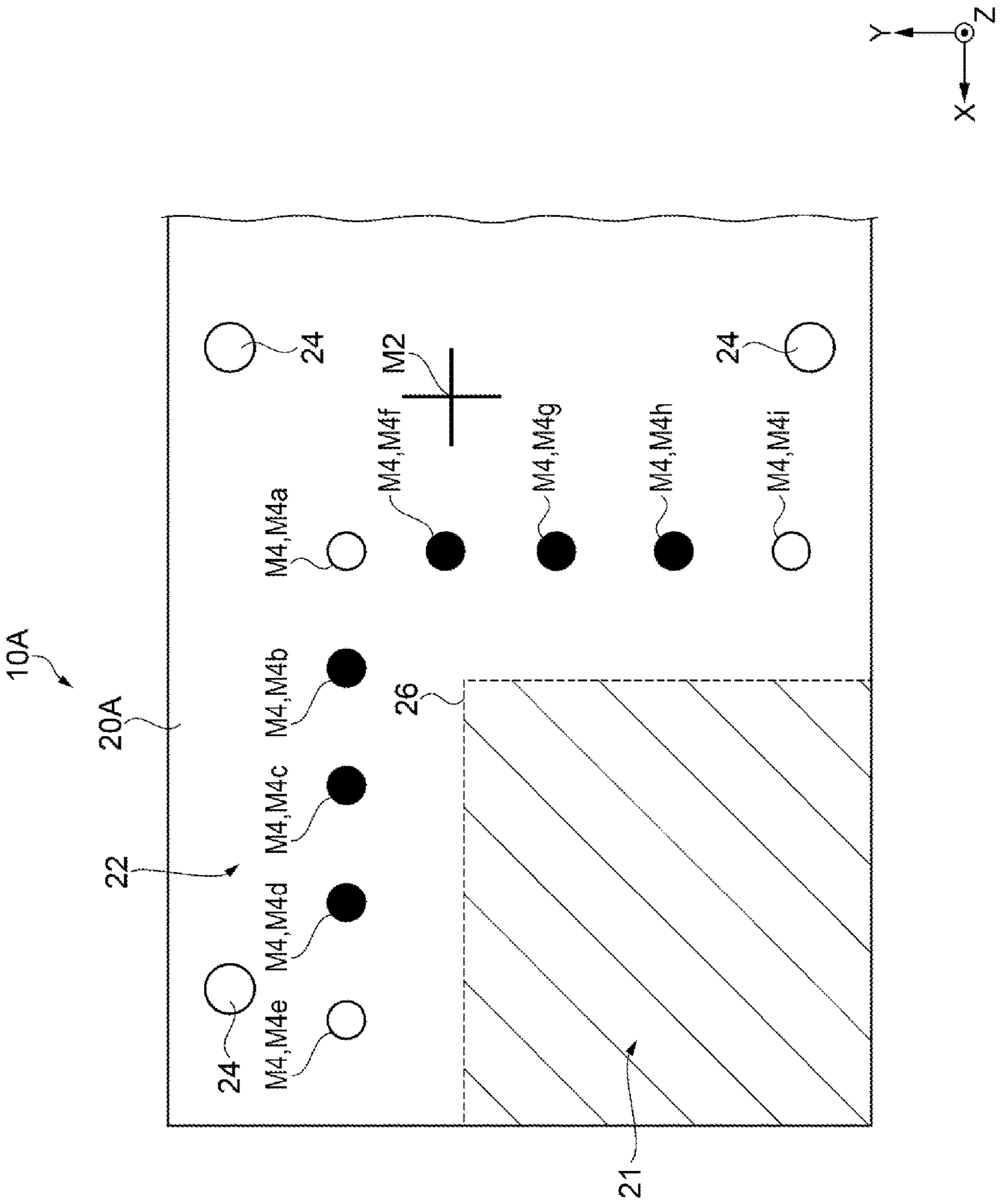
FIG. 10 is a schematic view illustrating a configuration of the control method of the support unit according to the second exemplary embodiment.

Further, as illustrated in FIG. 6 and FIG. 10, when the placement unit 40 is a second position PS2 in the +Z direction with respect to the first position Psi, the control unit 60 lights the light source M4*a*, the light source M4*e*, and the light source M4*i* (indicated with the white circle (open circle, ○) in the drawing), based on the position data from the rotary encoder 54. Further, the light sources M4 other than those are turned off (indicated with the black circle (filled circle, θ) in the drawing).

In other words, the control unit 60 in the present exemplary embodiment controls the plurality of light sources M4 an interval between the plurality of lighted light sources M4 is increased as the distance between the table unit 20A and the placement unit 40 is increased.

Further, in this state, the imaging device CD performs imaging while adjusting the focal point TN on the surface of the medium S. The control unit 60 acquires the image data from the imaging device CD via the I/F 64. The image data includes medium image data being the image data of the medium S and mark image data being the image data of the light sources M4 (M4*a*, M4*e*, M4*i*), the second mark M2, and the third mark M3 that are imaged together with the medium S.

The control unit 60 performs scale calculation for the image data, based on the distances between the light sources M4 (M4*a*, M4*e*, M4*i*). With this, the image data can easily be corrected. Further, a surface state of the medium S, a weaving pitch dimension of the medium S, a fuzz state of the medium S, and the like can be grasped. Further, the deviation amount between the second mark M2 and the third mark M3 in the image data is read, and thus the information relating to the thickness of the medium S is acquired. In general, when a user uses the predetermined imaging device CD, accuracy (the number of pixels) of the imaging device CD is constant regardless of the distance between the imaging device CD and the table unit 20A. Therefore, the number of pixels of the imaging device CD does not vary due to the distance between the table unit 20A and the placement unit 40. In other words, when the imaging device CD images the medium S being an imaging target, an absolute error relating to detection of an interval between the light sources M4 is constant regardless of the distance between the table unit 20A and the placement unit 40. In this state, when the distance between the table unit 20A and the placement unit 40 is increased, a ratio of the absolute error to the interval between the light sources M4 is increased. Thus, detection accuracy of the interval of the respective light sources M4 is relatively reduced. According to the present exemplary embodiment, increase of the ratio of the absolute error to the interval of the respective light sources M4 is prevented, and thus detection accuracy of the interval of the respective light sources M4 can be prevented from being relatively reduced.

Further, the control unit 60 in the present exemplary embodiment is configured to calculate various printing conditions for the printing apparatus that performs printing on the medium S.

Specifically, for example, based on the result obtained by measuring a surface state of the medium S, a weaving pitch dimension of the medium S, a fuzz state of the medium S, a thickness dimension of the medium S, and the like from the image data of the medium S, a printing condition (a head height condition, a transport speed condition, an ink ejection condition, or the like) stored in the memory 62 is extracted. With this, an appropriate printing condition can be set for the medium S.

3. Third Exemplary Embodiment

Next, a configuration of a printing system 1 is described.

Figure 11:
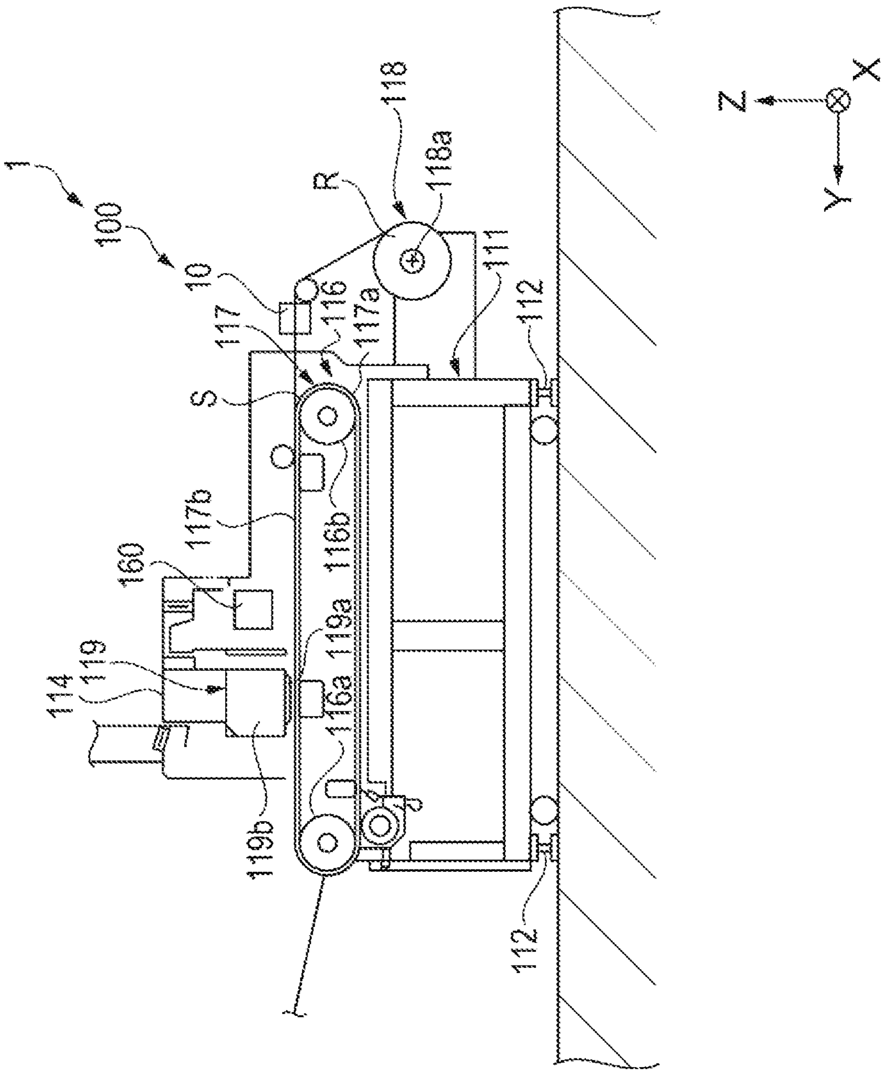
FIG. 11 is a schematic view illustrating a configuration of a printing system according to a third exemplary embodiment.

As illustrated in FIG. 11, the printing system 1 in the present exemplary embodiment includes the support unit 10 that supports the medium S imaged by the imaging device CD, a control unit 160 as a processing unit that processes image data of an image captured by the imaging device CD, and a printing unit 100 that performs printing on the medium S in accordance with a result of the processing of the image data by the control unit 160. Examples of the medium S include fabrics or paper.

The support unit 10 in the present exemplary embodiment is arranged between a medium holding unit 118 that holds the medium S and a glue belt 117 in the printing unit 100. Note that the configuration of the support unit 10 is similar to that in the first exemplary embodiment, and thus description thereof is omitted. Further, the support unit 10A (the second exemplary embodiment) may be used in place of the support unit 10.

The printing unit 100 includes a main body frame 111, a main body cover 114, a transport unit 116, a recording unit 119, and the like.

The main body frame 111 is configured as a base portion in which each unit of the printing unit 100 is provided. A plurality of legs 112 are arranged at an end portion of the main body frame 111 in the −Z direction.

The main body cover 114 is an exterior member that covers the recording unit 119 and the like.

The transport unit 116 includes a driving roller 116*a*, a driven roller 116*b*, the glue belt 117, and the medium holding unit 118.

The medium holding unit 118 holds a roll body R obtained by winding the sheet-like medium S in an overlapping manner. The medium holding unit 118 includes a holding shaft 118*a* that holds the roll body R. The holding shaft 118*a* is configured to rotate. Rotation of the holding shaft 118*a* feeds out the medium S from the roll body R to the side of the glue belt 117.

The driving roller 116*a* rotates, and thus the glue belt 117 moves. Movement of the glue belt 117 allows the medium S to be transported in the +Y direction. In the +Y direction, the driving roller 116*a* is arranged downstream, and the driven roller 116*b* is arranged upstream. Further, each of the driving roller 116*a* and the driven roller 116*b* includes a rotation shaft in the direction along the X-axis.

The glue belt 117 is configured as an endless belt obtained by joining both ends of a planar plate having elasticity. The glue belt 117 is wound around an outer circumferential surface of the driving roller 116*a* and an outer circumferential surface of the driven roller 116*b*, and the glue belt 117 is movable in a circular manner.

An outer circumferential surface 117*a* of the glue belt 117 has adhesiveness, and is capable of supporting and adsorbing the medium S. The "adhesiveness" refers to a property of being capable of temporarily adhering to other members and allowing peeling-off from an adhesion state.

On the outer circumferential surface 117*a*, a planar portion positioned in the +Z direction between the driving roller 116*a* and the driven roller 116*b* is a support surface 117*b*. In other words, the glue belt 117 includes the support surface 117*b*. The support surface 117*b* partially faces the recording unit 119 in the direction along the Z-axis.

The recording unit 119 performs printing (recording) on the medium S being transported. The recording unit 119 includes a recording head 119*a* and a carriage 119*b* that supports the recording head 119*a* in a reciprocable manner in the direction along the X-axis. The recording unit 119 is arranged above the glue belt 117 (in the −Z direction).

The recording head 119*a* includes a plurality of nozzles, which are not illustrated, and is arranged to face the support surface 117*b*. The recording head 119*a* ejects ink as a liquid from the plurality of nozzles onto the medium S. With this, recording on the medium S can be performed. Note that the printing unit 100 includes an ink tank that accommodates the ink, and the ink is supplied from the ink tank to the recording head 119*a*.

Figure 12:
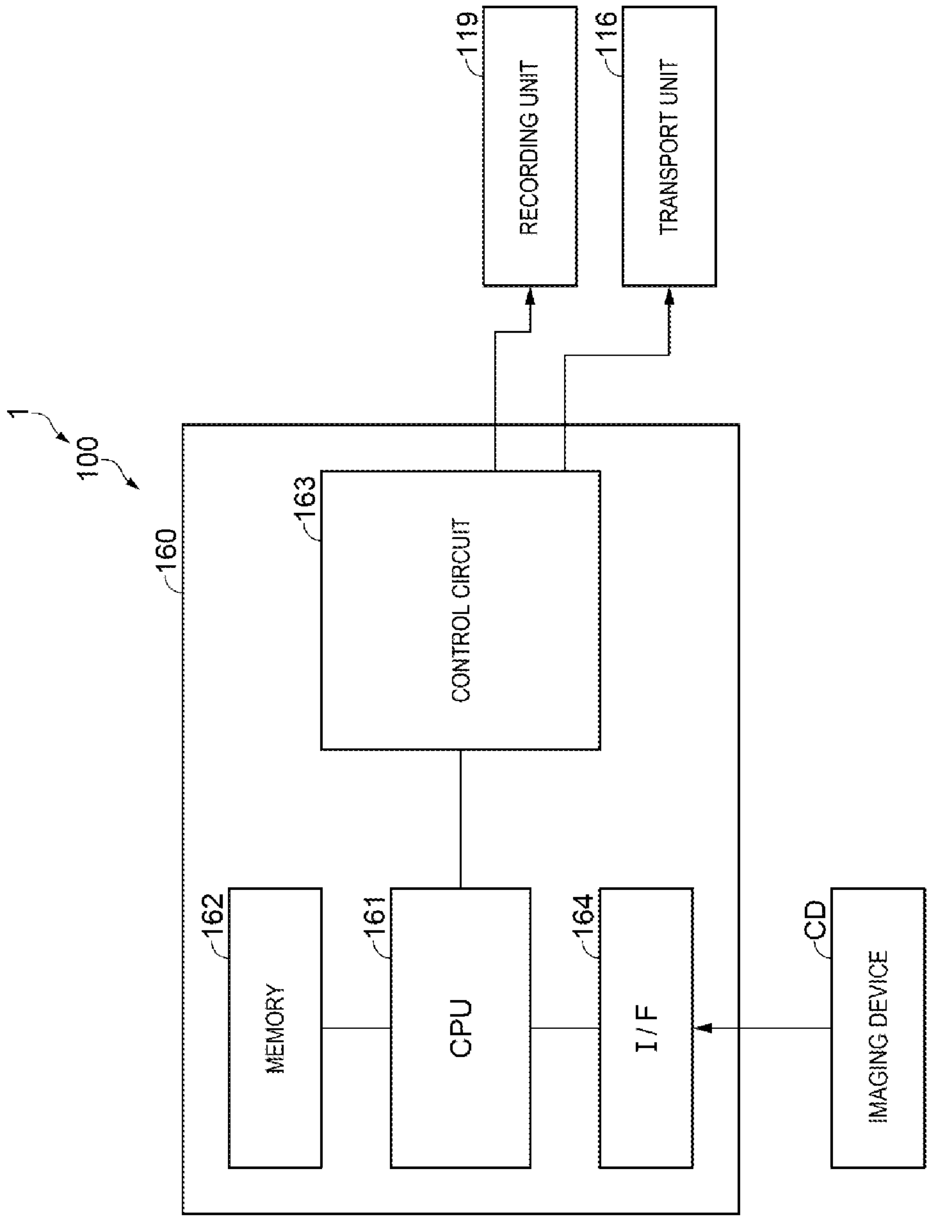
FIG. 12 is a block diagram illustrating a control configuration of the printing system according to the third exemplary embodiment.

As illustrated in FIG. 12, the control unit 160 includes a CPU 161, a memory 162, a control circuit 163, and an interface (I/F) 164. The CPU 161 is an arithmetic processing device. The memory 162 is a storage device ensuring a region for storing various programs, a working region, and the like, and includes a storage element such as a RAM and an EEPROM. Further, the control unit 160 acquires the image data from the imaging device CD via the I/F 164. The image data includes the medium image data being the image data of the medium S and the mark image data being the image data of the plurality of marks M imaged together with the medium S. The image data is generated by electronizing the image.

On the support unit 10, the medium S on which printing is performed in the printing unit 100 is imaged. Further, the medium S is imaged along the transport direction in which the medium S is transported in the printing unit 100. Thus, the transport direction of the medium S in the acquired image data can easily be grasped.

The control unit 160 grasps a property of the medium S based on the acquired image data.

Specifically, scale calculation for the image data is performed based on the distances between the marks M (M1*a*, M1*b*, M1*c*). With this, the image data can easily be corrected. Further, a surface state of the medium S, a weaving pitch dimension of the medium S, a fuzz dimension of the medium S, and the like are calculated.

Further, the deviation amount between the second mark M2 and the third mark M3 is read from the image data, and thus the thickness dimension of the medium S is calculated.

Further, the control unit 160 controls the recording unit 119, the transport unit 116, and the like.

Specifically, for example, based on the result obtained by measuring a surface state of the medium S, a weaving pitch dimension of the medium S, a fuzz state of the medium S, a thickness dimension of the medium S, and the like from the image data of the medium S, a printing condition (a head height condition, a transport speed condition, an ink ejection condition, or the like) stored in the memory 162 is extracted. Further, based on the extracted printing condition, the recording unit 119 and the transport unit 116 are controlled.

As described above, according to the present exemplary embodiment, even when the distance between the imaging device CD and the medium S varies due to an imaging method performed by a user, the image data is corrected by the control unit 160 based on the distances between the plurality of marks M. With this, an appropriate printing condition can be set, and accuracy of printing on the medium S can be improved.

Further, with an in-line configuration in which the support unit 10 is mounted to the printing unit 100, the image data matching with the transport direction of the medium S can be acquired. Thus, an accurate property of the medium S can be acquired, and an appropriate printing condition or the like can be set.

Note that the support unit 10 in the present exemplary embodiment has an in-line configuration, but may have an off-line configuration. In other words, the support unit 10 may be arranged independently from the printing unit 100. In this manner, effects similar to those described above can also be acquired by connecting the support unit 10 and the control unit 160 to each other via a network.

Further, the control unit 160 in the present exemplary embodiment is mounted to the printing unit 100, but is not limited thereto. The control unit 160 may be arranged independently from the printing unit 100. In this case, for example, the control unit 160 is provided to a server device of an operator who provides maintenance services. In other words, a user transmits, to the operator, the image data acquired from the support unit 10. The operator performs correction based on the image data, grasps a property of the medium S, and extracts a printing condition. Then, the printing condition is transmitted to the user, and is reflected to a driving condition or the like of the printing unit 100. The image data acquired by the user can easily be corrected based on the distances between the marks M (M1*a*, M1*b*, M1*c*). In other words, even when an imaging environment or the like varies for each user, the image data can easily be corrected. Thus, a property of the medium S can securely be grasped, and an appropriate printing condition can be provided.

Contents derived from the exemplary embodiments are described below.

A support unit is configured to support a medium that is imaged by an imaging device and on which printing is performed by a printing apparatus in accordance with a result of the imaging. The support unit includes a table unit including a support region that supports the medium and a non-support region that does not support the medium, and a sandwiching unit having a portion with light transmissivity and configured to sandwich the medium with the table unit. The non-support region is provided with a plurality of marks recognizable by the imaging device.

With this configuration, the medium is sandwiched between the table unit and the sandwiching unit, and thus the medium can stably be held on the table unit. Further, the sandwiching unit has light transmissivity, the medium and the mark can easily be imaged by the imaging device.

Further, the medium and the plurality of marks are imaged, and hence the information relating to the medium can be corrected based on the distance between the marks. In other words, it is possible to provide the support unit that can easily correct varied imaging information, based on the distance between the marks that are imaged at the same time even when the distance between the imaging device and the medium or the like varies due to a user. Further, the support unit is used, and thus a property of the medium can be grasped accurately.

In the support unit, the non-support region may be provided with a second mark recognizable by the imaging device, and the sandwiching unit may be provided with a third mark corresponding to the second mark.

With this configuration, the deviation amount between the second mark and the third mark may vary in accordance with the thickness of the medium on the table unit. With this, a user (or a terminal) can grasp the information relating to the thickness of the medium in accordance with the deviation amount between the second mark and the third mark.

The support unit may further include a placement unit on which the imaging device is placed in a state in which a lens unit of the imaging device is directed to the medium supported on the table unit.

With this configuration, a user can capture an image of the medium while suppressing shaking regardless of performance of the imaging device.

The support unit may further include a plurality of light sources configured to emit light, and a control unit configured to control a lighting operation of the plurality of light sources. The placement unit may be configured to change a distance with the table unit. The plurality of marks may be formed of light emitted from a plurality of lighted light sources of the plurality of light sources. The control unit may control the plurality of light sources so that an interval between the plurality of lighted light sources increases as the distance between the table unit and the placement unit increases.

In general, when a user uses the predetermined imaging device, accuracy (the number of pixels) of the imaging device is constant regardless of the distance between the imaging device and the imaging target. Therefore, the number of pixels of the imaging device does not vary due to the distance between the table unit and the placement unit. In other words, when the imaging device capturing an image of the medium being an imaging target, an absolute error relating to detection of an interval between the marks is constant regardless of the distance between the table unit and the placement unit. In this state, when the distance between the table unit and the placement unit is increased, a ratio of the absolute error to the interval between the marks is increased. Thus, detection accuracy of the interval of the marks is relatively reduced. According to configuration described above, increase of the ratio of the absolute error to the interval of the respective marks is prevented, and thus detection accuracy of the interval of the respective marks can be prevented from being relatively reduced.

A printing system includes a support unit configured to support a medium imaged by an imaging device, a processing unit configured to process image data of an image captured by the imaging device, and a printing unit configured to perform printing on the medium in accordance with a result of the processing of the image data by the processing unit. The support unit includes a table unit including a support region that supports the medium and a non-support region that does not support the medium, and a sandwiching unit having a portion with light transmissivity and being configured to sandwich the medium with the table unit. The non-support region is provided with a plurality of marks recognizable by the imaging device. The image data includes medium image data being image data of the medium and mark image data being image data of the plurality of marks imaged together with the medium.

With this configuration, the distance between the imaging device and the medium, or the like varies due to an imaging method (measurement method) performed by a user, variation at the time of imaging can be corrected by the processing unit, based on the distance between the plurality of marks. With this, an appropriate printing condition can be set based on the image data, and accuracy of printing on the medium can be improved.

Further, the medium is imaged in the direction matching with the transport direction. Thus, property information relating to the medium can be acquired, and a printing condition or the like can be set.

What is claimed is:

1. A support unit configured to support a medium that is imaged by an imaging device and on which printing is performed by a printing apparatus in accordance with a result of the imaging, the support unit comprising:

a table unit including a support region that supports the medium and a non-support region that does not support the medium; and a sandwiching unit including a portion with light transmissivity and configured to sandwich the medium with the table unit, wherein the non-support region is provided with a plurality of marks recognizable by the imaging device and disposed at fixed positions on the non-support region.

2. The support unit according to claim 1, wherein the non-support region is provided with a second mark recognizable by the imaging device, and the sandwiching unit is provided with a third mark corresponding to the second mark.

3. The support unit according to claim 1, comprising a placement unit on which the imaging device is placed in a state in which a lens unit of the imaging device is directed to the medium supported on the table unit.

4. The support unit according to claim 3, comprising:

a plurality of light sources configured to emit light; and a control unit configured to control a lighting operation of the plurality of light sources, wherein the placement unit is configured to change a distance with the table unit, the plurality of marks are formed of light emitted from a plurality of lighted light sources of the plurality of light sources, and the control unit controls the plurality of light sources so that an interval between the plurality of lighted light sources increases as the distance between the table unit and the placement unit increases.

5. A printing system, comprising:

a support unit configured to support a medium imaged by an imaging device;

a processing unit configured to process image data of an image captured by the imaging device; and a printing unit configured to perform printing on the medium in accordance with a result of the processing of the image data by the processing unit, wherein the support unit includes:

a table unit including a support region that supports the medium and a non-support region that does not support the medium; and a sandwiching unit having a portion with light transmissivity and configured to sandwich the medium with the table unit, the non-support region is provided with a plurality of marks recognizable by the imaging device and disposed at fixed positions on the non-support region, and the image data includes medium image data being image data of the medium and mark image data being image data of the plurality of marks imaged together with the medium.

6. The support unit according to claim 1, wherein a distance between two marks of the plurality of marks has a defined dimension.

7. The printing system according to claim 5, wherein a distance between two marks of the plurality of marks has a defined dimension.

* * * * *